(12) United States Patent
Hebiguchi

(10) Patent No.: US 6,292,237 B1
(45) Date of Patent: Sep. 18, 2001

(54) ACTIVE-MATRIX LIQUID-CRYSTAL DISPLAY DEVICE AND SUBSTRATE THEREFOR

(75) Inventor: Hiroyuki Hebiguchi, Miyagi-ken (JP)

(73) Assignees: Alps Electric Co., Ltd., Tokyo (JP); LG. Philips LCD Co., Ltd., Seol (KR)

( * ) Notice: Subject to any disclaimer, the term of this patent is extended or adjusted under 35 U.S.C. 154(b) by 0 days.

(21) Appl. No.: 09/350,630

(22) Filed: Jul. 9, 1999

(30) Foreign Application Priority Data

Jul. 16, 1998 (JP) .................................................. 10-202292

(51) Int. Cl.$^7$ .................................................. G02F 1/1343
(52) U.S. Cl. .............................................. 349/39; 349/141
(58) Field of Search ....................................... 349/39, 141

(56) References Cited

U.S. PATENT DOCUMENTS

| | | |
|---|---|---|
| 5,151,689 | 9/1992 | Kabuto et al. . |
| 5,337,173 | * 8/1994 | Atsumi et al. .......................... 349/39 |
| 5,457,553 | * 10/1995 | Mori ....................................... 349/39 |

\* cited by examiner

*Primary Examiner*—James A. Dudek
(74) *Attorney, Agent, or Firm*—Brinks Hofer Gilson & Lione

(57) ABSTRACT

An active-matrix substrate for use in an active-matrix liquid-crystal display device of double-scanning-line type has a storage capacitor structure free from problems such as a reduction in an aperture ratio and an increase in gate wiring resistance. In the active-matrix substrate, thin-film transistors and pixel electrodes are arranged on both sides of each data line. A pair of gate lines, between which two adjacent pixels are arranged, is routed to respectively control two adjacent pixels with their respective signals. A storage capacitor of one of the adjacent pixels between adjacent data lines is formed of an overlapping portion of a capacitor electrode in one pixel, with the other gate line being paired with the gate line controlling the one pixel, and the storage capacitor is extended from the one pixel into the other pixel.

6 Claims, 12 Drawing Sheets

ACTIVE-MATRIX LIQUID-CRYSTAL DISPLAY DEVICE AND SUBSTRATE THEREFOR

BACKGROUND OF THE INVENTION

1. Field of the Invention

The present invention relates to an active-matrix liquid-crystal display device and a substrate for use in the device and, more particularly, to a structure of storage capacitors in a substrate of an active-matrix liquid-crystal display device having a double-scanning-line feature.

2. Description of the Related Art

Since active-matrix liquid-crystal display devices typically employ a data line for each column of an arrangement of pixels, a number of data drivers is required if the number of pixels per row is large. Since the data driver is relatively costly, the use of a large number of data drivers makes the entire device expensive. Furthermore, in this type of conventional art, a small display area, namely, a small liquid-crystal display panel is difficult to manufacture. The liquid-crystal display panel having a small display area needs a miniaturized terminal section for the data lines. The liquid-crystal display panel in the conventional art having a large number of data lines places a rigorous requirement for a narrow pitch of the data line terminal section. For this reason, the manufacturing of the data line terminal section is difficult, leading to a low production yield.

FIG. 11 and FIG. 12 show an active-matrix liquid-crystal display device, which is also filed in the Japanese Patent Office by the assignee of the present invention. The active-matrix liquid-crystal display device disclosed employs a smaller number of data lines to drive pixels compared to the other conventional devices.

FIG. 11 and FIG. 12 show two examples of equivalent circuits of active-matrix liquid-crystal devices having half as many data lines as that in other conventional art devices. Each pixel is surrounded by a one-dot chain line. A data line Dj is shared by two pixels PX(i,j) and PX(i,j+1) (i=1, . . . , m for both pixels) in two columns with the data line Dj interposed therebetween. With this arrangement, the number of data lines is halved, and the number of data drivers is also halved.

As for each row, two adjacent pixels connected to the single data line Dj, for example, PX(i,j) and PX(i,j+1), need to be driven by separate gate lines GAi and GBi. For this reason, the number of gate lines becomes twice as many as that in the conventional art (this wiring method may be called a double-scanning-line method). The increase in the number of gate drivers does not increase the cost of the device, because the gate driver is substantially less costly than the data driver. Referring to FIG. 11 and FIG. 12, two adjacent pixels between two adjacent data lines are driven by different gate lines. Referring to FIG. 11, all dots on one side of one data line are connected to either GA gate lines or GB gate lines. Referring to FIG. 12, dots on one side of one data line are alternately connected to GA gate lines and GB gate lines.

Referring to FIG. 13, there is shown an actual structure of the above active-matrix liquid-crystal display device, in which two pixels are surrounded by two data lines and two gate lines. As shown, a thin-film transistor (hereinafter referred to as a TFT) 51 is formed on the top side of a right pixel D5, and on the bottom side of a left pixel D6. The two pixels D5 and D6 are arranged in a point symmetry fashion. With this arrangement, a gate line 52 widens in its portion at the TFT 51, serving as a gate electrode for the TFT 51. A semiconductor active layer 53 is formed on the gate electrode. Formed on the semiconductor active layer 53 are a source electrode 55, extending from a data line 54, and a drain electrode 56 with a spacing being maintained therebetween. The drain electrode 56 is electrically connected to a pixel electrode 58 via a contact hole 57.

In the active-matrix liquid-crystal display device, each pixel needs a storage capacitor to hold a signal supplied thereto for one scanning period. The gate line 52 is greatly increased in width on the side of each pixel opposite to the TFT 51, and a capacitor electrode 60, which is electrically connected to the pixel electrode 58 via a contact hole 59, is overlapped on a wide portion 52a of the gate line 52. A storage capacitor 61 is formed of the capacitor electrode 60, the wide portion 52a of the gate line 52, and an insulating layer interposed between the capacitor electrode 60 and the wide portion 52a. A rectangular shape 62 represented by a one-dot chain line in FIG. 13 shows an aperture of a black matrix formed on a counter substrate (not shown).

To achieve a desired storage capacitance in the active-matrix liquid-crystal display apparatus, the capacitor electrode 60 needs to be a sufficient area. For this reason, part of the gate line 52 is widened. The wide portion 52a of the gate line 52 for forming the storage capacitor 61 causes a narrow portion 52b in the gate line 52 at the adjacent pixel. The narrow portion 52b, shown in FIG. 13, does not overlapped with another electrode, and does not contribute to the storage capacitance. The wide portion 52a thus needs to compensate for the effect of the narrow portion. As seen from the area of the aperture 62 of the black matrix represented by the one-dot chain line in FIG. 13, the wide portion 52a of the gate line 52 reduces the aperture ratio of the panel.

In the gate line 52, the narrow portion 52b is much narrower than the wide portion 52a, increasing wiring resistance.

SUMMARY OF THE INVENTION

Accordingly, it is an object of the present invention to provide a substrate for a double-scanning-line type active-matrix liquid-crystal display device in which each pixel has its own storage capacitor, wherein a substrate is free from problems such as a reduction in the aperture ratio and an increase in gate wiring resistance. It is also an object of the present invention to provide an active-matrix liquid-crystal display device that incorporates the substrate.

To achieve the above object, in the substrate for an active-matrix liquid crystal display device of the present invention, a plurality of data lines and a plurality of gate lines are arranged in a matrix on a substrate. Thin-film transistors having pixel electrodes connected thereto are arranged on both sides of each data line corresponding to the respective gate line. The plurality of gate lines are arranged so that the pixel electrodes on both sides of each data line are controlled by signals from corresponding paired gate lines sandwiching the pixel electrodes arranged on both sides of the data line. A storage capacitor, corresponding to each of adjacent pixel electrodes between adjacent data lines, is extended from one of the pixel electrodes to the other adjacent pixel electrode on the other gate line paired with the one controlling gate line, in order to have a desired capacitance.

The basic concept in the conventional substrate for the active-matrix liquid-crystal display device is that the storage capacitor arranged in each pixel has to be formed within the region of each pixel. A wide portion having a large area is thus required in the gate line to achieve a desired capacitance. This arrangement reduces the aperture ratio and increases the gate wiring resistance.

The feature of the present invention is that the region of the storage capacitor of one pixel extends between the adjacent data lines to the other adjacent pixel, rather than being limited to within the region of one pixel. With this arrangement, the gate line is efficiently taken advantage of for the storage capacitor, the wide portion of the gate line in the conventional art is dispensed with, and the aperture ratio is improved. Further, the gate wiring resistance is minimized because the narrow portion of the gate line is also dispensed with.

In accordance with the present invention, the storage capacitor is formed in a given pixel, in which a gate line for controlling the pixel and an opposing gate line are each provided with a wide portion and a modestly narrow portion that is not so narrow as the conventional gate line. A capacitor electrode electrically connected to the pixel electrode of the pixel is arranged so that the capacitor electrode overlaps with the wide portion of the gate line. The capacitor electrode is extended over the other adjacent pixel to the narrow portion. All of the overlapping area between the capacitor electrode and the gate line is taken advantage of as the storage capacitor.

The pixel electrode is extended from one pixel to the other pixel, along the gate line opposite to the gate line of interest so that the storage capacitor is formed between the pixel electrode and the gate line without using the capacitor electrode.

Since the storage capacitor straddles the other pixel, a desired capacitance is obtained without the need for the formation of the wide portion in the gate line. The gate line having a constant width thus works.

An active-matrix liquid-crystal display device of the present invention includes a pair of opposing substrates and a liquid crystal interposed therebetween, wherein employed as one of the substrates is the substrate of the present invention.

The substrate of the present invention, in which the storage capacitor is arranged to straddle between one pixel and the other pixel, between the data lines, is applied to an active-matrix liquid-crystal display device in which the two adjacent pixels are arranged in a point symmetry fashion between the data lines. The double-scanning-line type active-matrix liquid-crystal display device may adopt several forms of wiring method. The present invention applies to the wiring methods shown in FIG. 11 and FIG. 12.

The present invention finds applications in an active-matrix liquid-crystal display device in which a pixel electrode is arranged on one substrate and a common electrode is arranged on the other substrate, and the liquid crystal is driven by an electric field established between the electrodes in a direction perpendicular to the surfaces of the substrates. Furthermore, the present invention finds applications in a so-called IPS (In-Plane Switching) liquid-crystal display device in which a horizontally aligned electric field is applied to the liquid crystal in a direction parallel to the surface of one substrate in cooperation with the pixel electrode, and in which a common electrode, forming the storage capacitor along with the gate line, is arranged.

Generally, the IPS liquid-crystal display device is intended to increase the viewing angle of the panel. In the IPS liquid-crystal display device having a laminated structure constructed of a gate line, an insulating layer, a pixel electrode, an insulating layer and a common electrode, and proposed by the inventors of this invention, a storage capacitor has a double-layer structure on the gate line (as will be described later in connection with one embodiment of the present invention). The storage capacitor is thus efficiently formed, thereby increasing the aperture ratio.

BRIEF DESCRIPTION OF THE DRAWINGS

FIGS. 7A and 7B show an active-matrix liquid-crystal display device as a third embodiment of the present invention, wherein FIG. 7A is a plan view of the device, and FIG. 7B is a sectional view taken along a line VIIB—VIIB as shown in FIG. 7A;

FIGS. 9A and 9B show an active-matrix liquid-crystal display device as a fourth embodiment of the present invention, wherein FIG. 9A is a plan view of the device and FIG. 9B is a sectional view taken along a line IXB—IXB as shown in FIG. 9A;

DESCRIPTION OF THE PREFERRED EMBODIMENTS

First Embodiment

Figure 1:
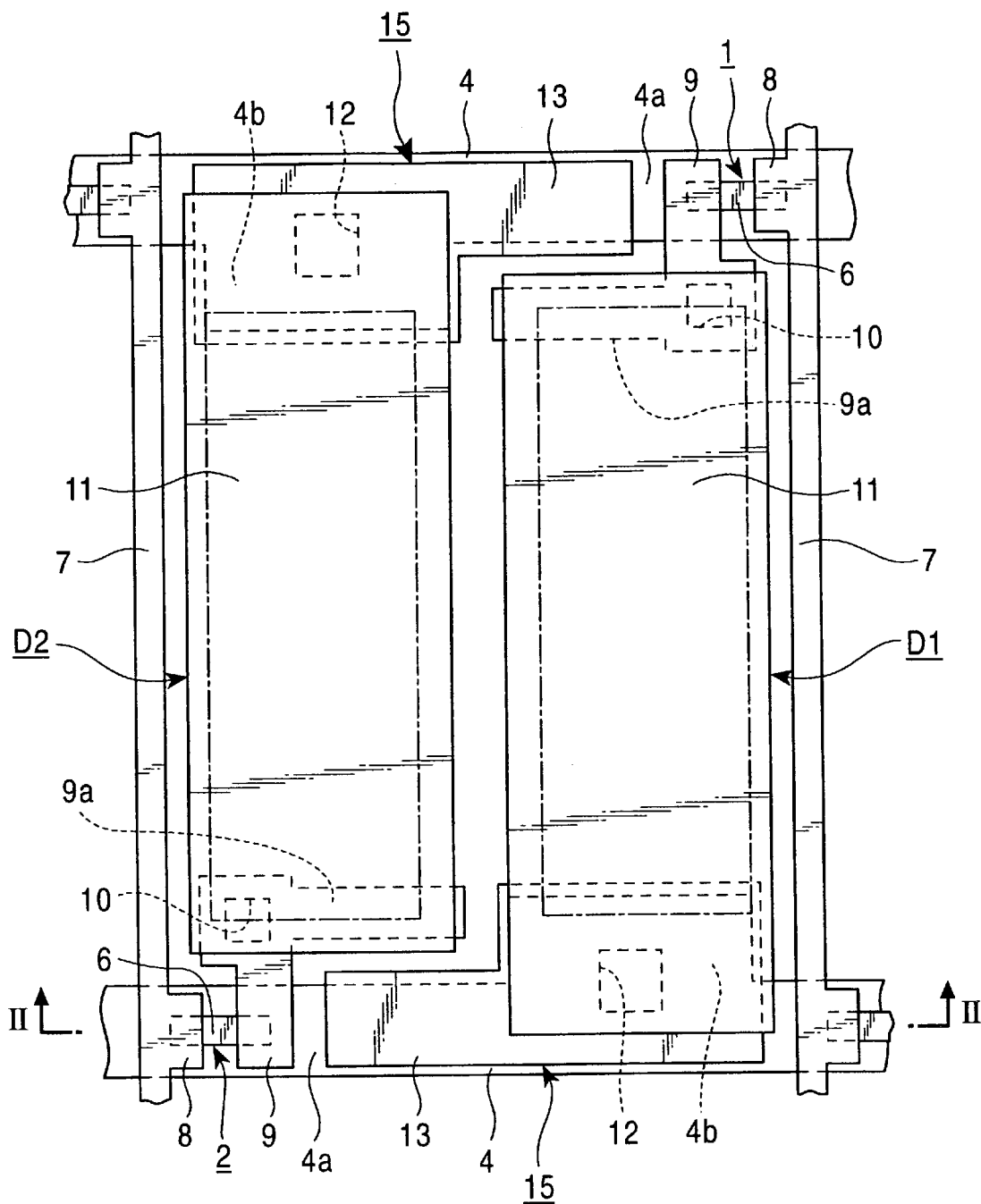
FIG. 1 is a plan view showing a first embodiment of an active matrix substrate of the present invention.
Figure 2:
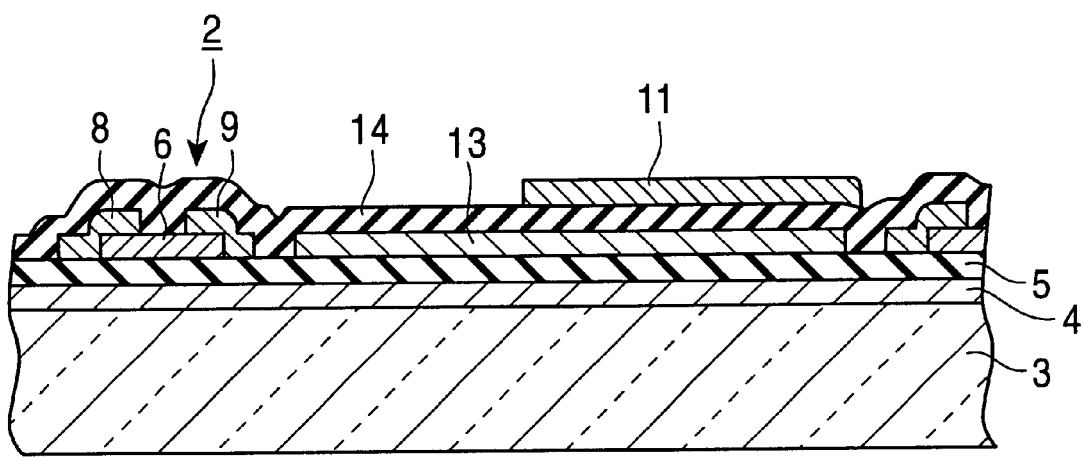
FIG. 2 is a sectional view of the construction of the active-matrix substrate, taken along a line II—II as shown in FIG. 1.

A first embodiment of the present invention is now discussed, referring to FIG. 1 and FIG. 2.

FIG. 1 is a plan view showing a first embodiment of a substrate for use in an active-matrix liquid-crystal display device (hereinafter referred to as an "active-matrix substrate"). As in the one discussed with reference to FIG. 13, two pixels are arranged within an area surrounded by two adjacent data lines 7 and 7 and two adjacent gate lines 4 and 4. FIG. 2 is a sectional view of the first embodiment, taken along a line II—II (running through a TFT 2 of one pixel D2 and a storage capacitor 15 of another pixel D1, along the gate line 4) as shown in FIG. 1.

Figure 11:
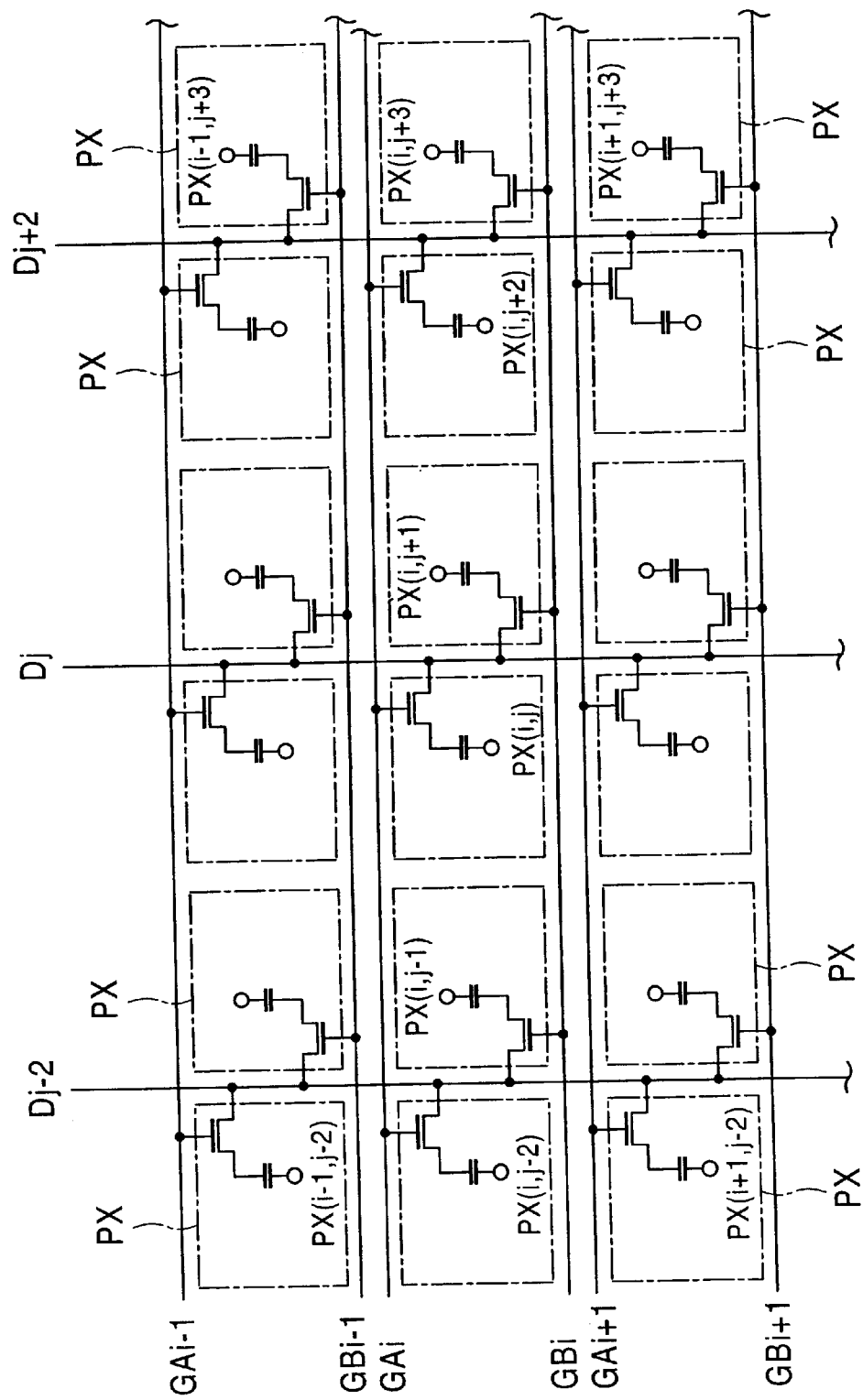
FIG. 11 is an equivalent circuit diagram of one example of a conventional active-matrix liquid-crystal display device of a double-scanning-line type.
Figure 12:
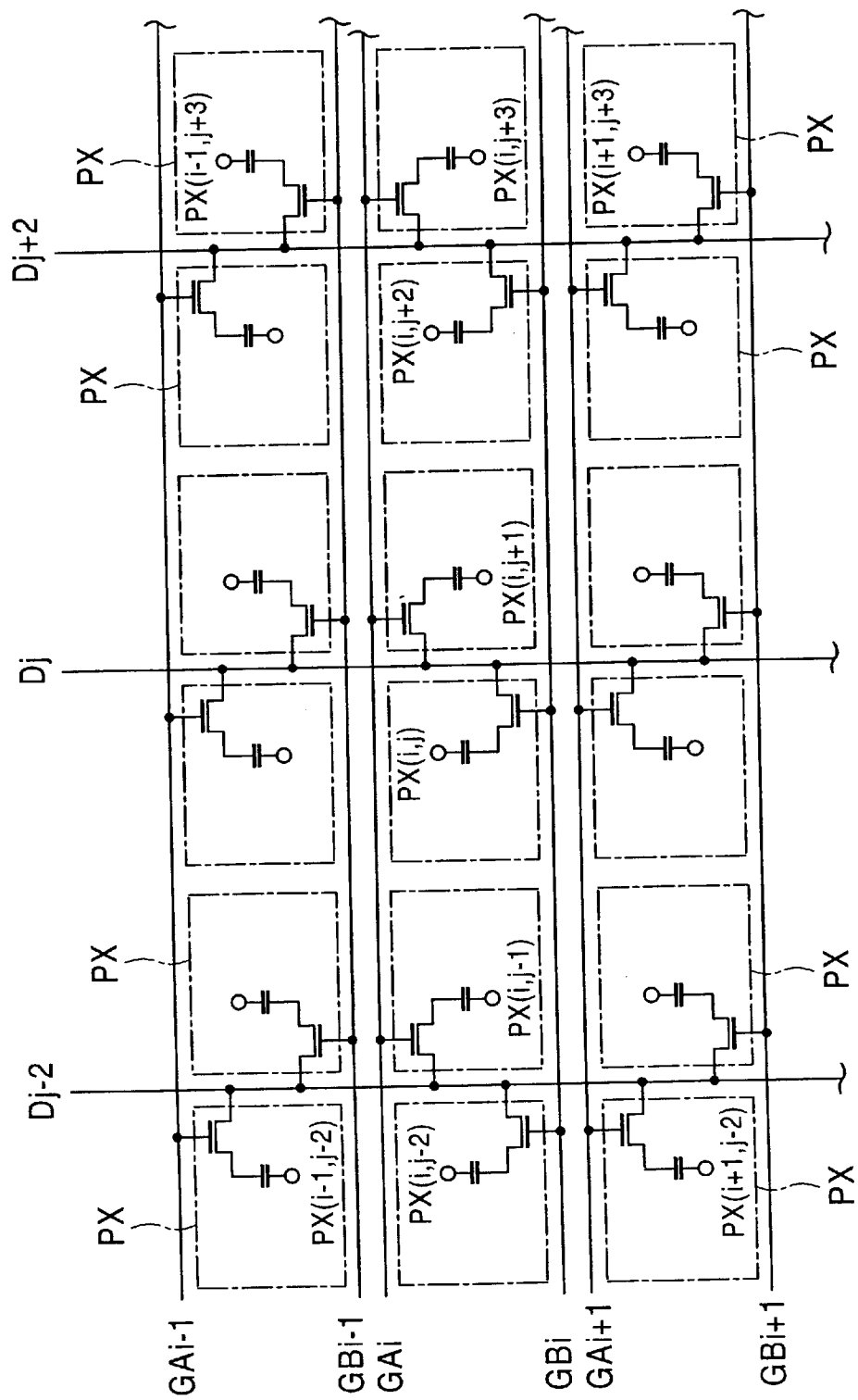
FIG. 12 is an equivalent circuit diagram of another example of a conventional active-matrix liquid-crystal display device of a double-scanning-line type.

Referring to FIG. 1, in the active-matrix substrate of this embodiment, a TFT 1 is formed in the pixel D1 at the top right corner while the TFT 2 is formed in the pixel D2 at the bottom left corner. The pixels D1 and D2 are arranged in a point symmetry fashion. As for the wiring method of the active-matrix substrate, this arrangement is a double-scanning-line wiring method, like the ones shown in FIG. 11 and FIG. 12.

Referring to FIG. 2, the gate line 4 is formed on a glass substrate 3. The gate line 4 is narrow at the TFT side of one pixel and wide on the storage capacitor 15 side of the other pixel as shown in FIG. 1. The difference in width between a narrow portion 4a and a wide portion 4b is much smaller than that in the conventional structure shown in FIG. 13. The gate line 4 serves as a gate electrode in TFT 1 and TFT 2. As shown in FIG. 2, a semiconductor active layer 6 is formed on a gate insulator layer 5 on the gate electrode. Arranged on the semiconductor active layer 6, as shown in FIG. 1, are a source electrode 8 and a generally L-shaped drain electrode 9, with a space being maintained therebetween. The portion of the generally L-shaped drain electrode 9 extending over the gate line 4 serves as a cover for shielding stray light due to misalignment.

As shown in FIG. 1, the drain electrode 9 is electrically connected to a pixel electrode 11 via a contact hole 10. The pixel electrode 11 has a contact hole 12 in its end opposite to the contact hole 10, and is electrically connected to a capacitor electrode 13 through the contact hole 12. The capacitor electrode 13 is formed of the same layer as that for the source electrode 8 (data line 7) and the drain electrode 9. The pixel electrode 11 is formed on an insulator layer 14 on the capacitor electrode 13.

The feature of the present invention is that the capacitor electrode 13 in one pixel D2 (D1) is extended over the wide portion 4b of the gate line 4 arranged oposite to the gate line 4 that controls the pixel D1 (D2), and is extended along the narrow portion 4a of the gate line 4 towards the other pixel D1 (D2) adjacent to the pixel D2 (D1), as shown in FIG. 1A, storage capacitor 15 is thus formed of an overlapping area of the capacitor electrode 13 of the pixel D1 (D2) and the wide area 4b of the gate line 4, and an overlapping area of the capacitor electrode 13 extended over to the other pixel D2 (D1) and the narrow portion 4a of the gate line 4.

Figure 13:
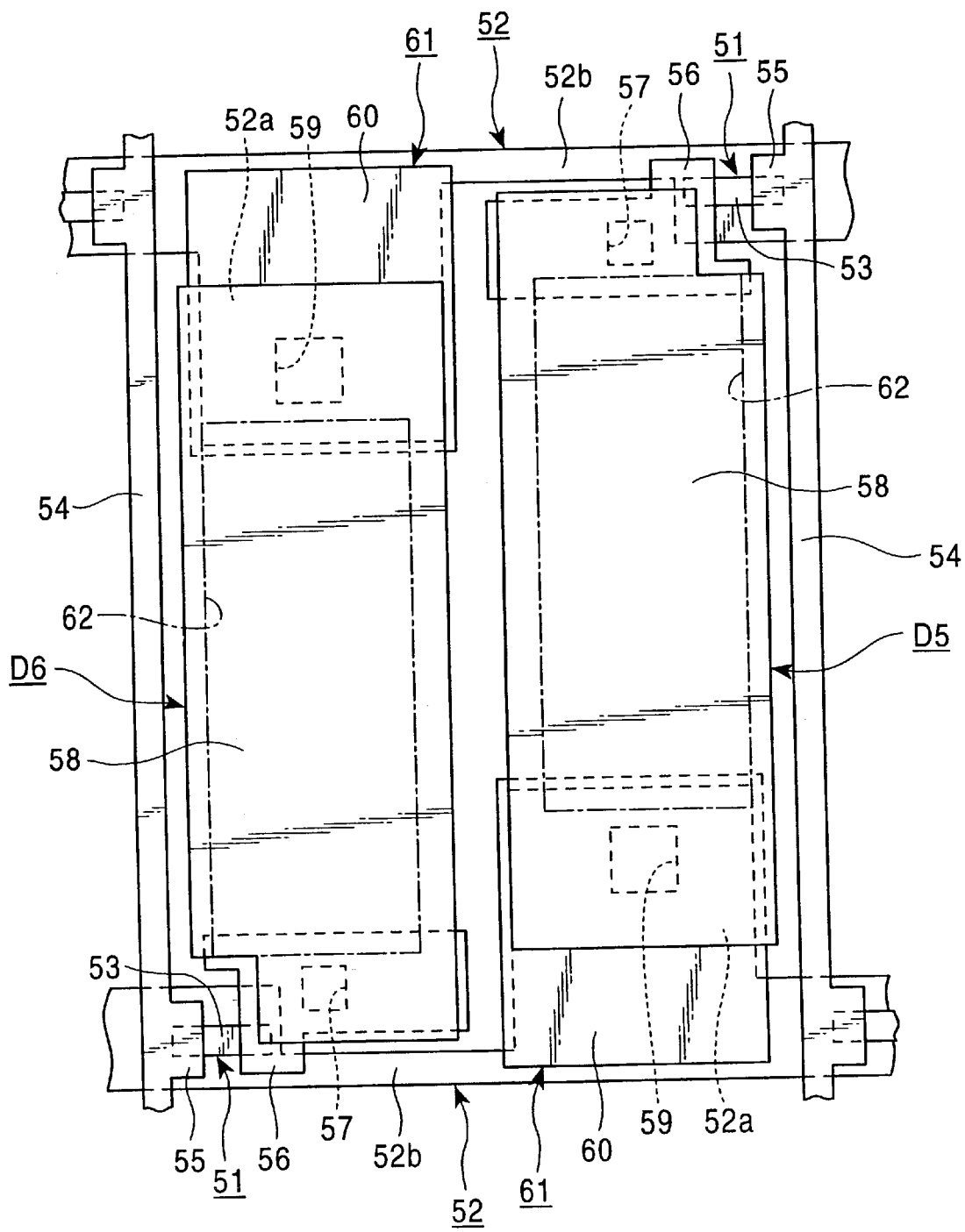
FIG. 13 is a detailed plan view of the active-matrix substrate, the equivalent circuit diagram of which is shown in FIG. 11 and FIG. 12.

In the active-matrix substrate of this embodiment, the formation of the storage capacitor 15 in one pixel D2 (D1) is extended over to the other pixel D1 (D2) adjacent to the the pixel D2 (D1), rather than being limited to within the area of the pixel D2 (D1). The gate line 4 is efficiently used to form the storage capacitor 15. For this reason, unlike the conventional art, a wide portion substantially wider than a narrow portion is not required, and the aperture ratio is thus improved. For example, when the same design rule as the one in the conventional structure shown in FIG. 13 is used in the design of the active-matrix substrate of this embodiment shown in FIG. 1 to achieve an equal storage capacitance, the aperture ratio is improved by about 32% to 36%. Furthermore, since the difference in width between the wide portion 4b and the narrow portion 4a in the gate line 4 is not so large as in the conventional art, the increase in gate wiring resistance is small.

In the first embodiment, the capacitor electrode 13 is constructed of the same layer as the source electrode 8 and the drain electrode 9, and the storage capacitor 15 is constructed of the capacitor electrode 13 and the gate line 4. With this arrangement, the interposed dielectric layer (only the gate insulator layer 5) is thin, compared to the one in the storage capacitor 15 which is formed of the pixel electrode 11 and the gate line 4. The capacitance per unit area is thus larger. Given the same storage capacitance, a smaller area for the capacitance works, thus contributing to the improvement of the aperture ratio.

Second Embodiment

A second embodiment of the present invention is now discussed, referring to FIG. 3 through FIG. 6.

Figure 3:
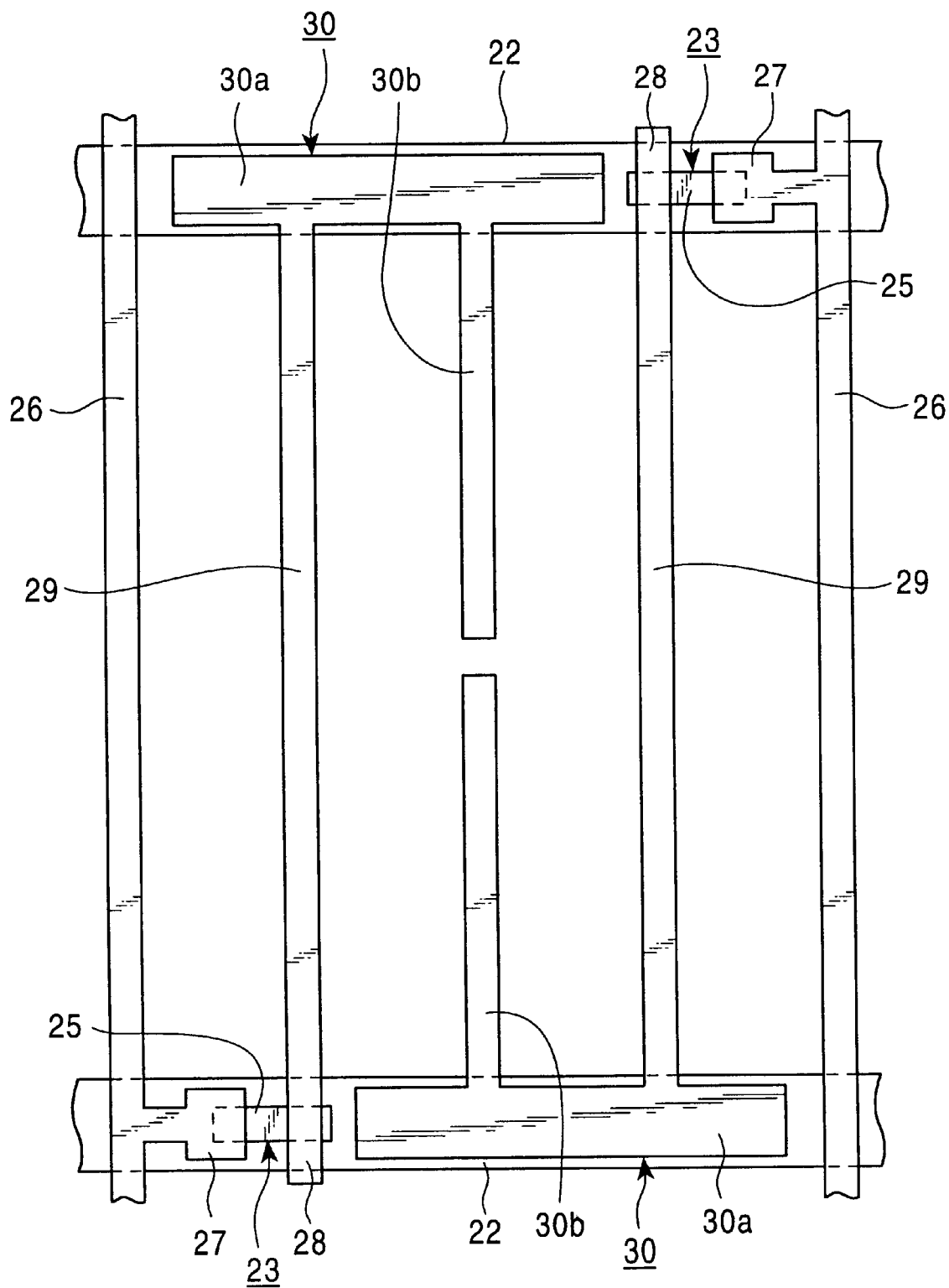
FIG. 3 is a plan view showing a second embodiment of an active-matrix substrate of the present invention with a common electrode not shown.
Figure 4:
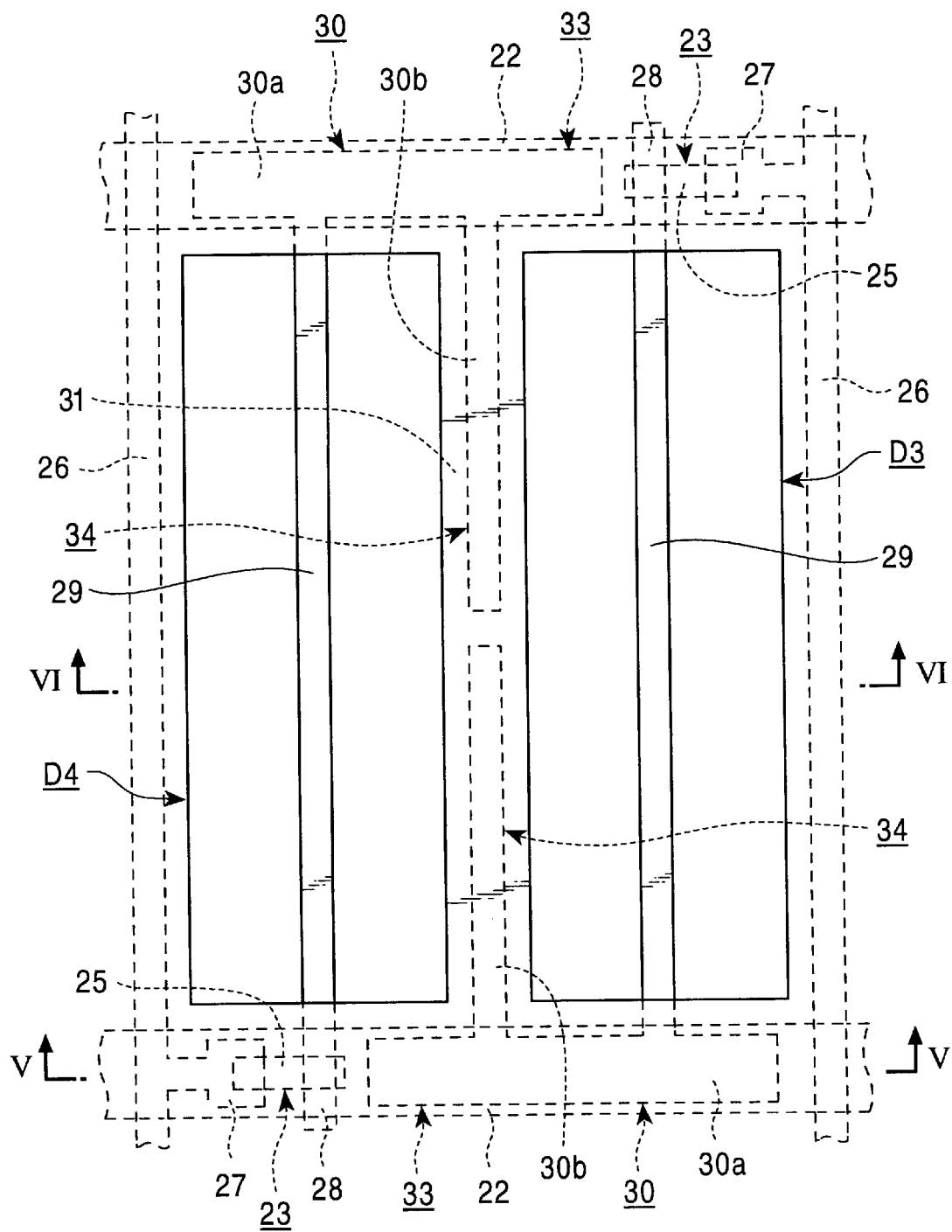
FIG. 4 is a plan view showing the second embodiment of the active-matrix substrate of the present invention including the common electrode.

FIG. 3 and FIG. 4 are plan views showing the second embodiment of the active-matrix substrate of the present invention. FIG. 3 shows the substrate without a common electrode, FIG. 4 shows the substrate including the common electrode, FIG. 5 shows a sectional view of the substrate, taken along a line V—V (running through the TFT and the storage capacitor, along the length of the gate line) shown in FIG. 4, and FIG. 6 is a sectional view of the substrate, taken along a line VI—VI (running through the centers of the pixels, in parallel to the gate line) shown in FIG. 4.

In the second embodiment, the storage capacitor of the present invention is applied to an IPS liquid-crystal display device.

Figure 5:
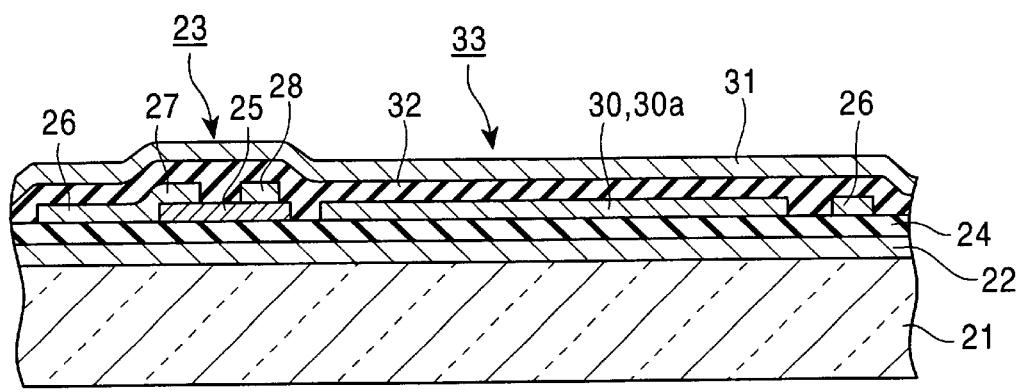
FIG. 5 is a sectional view of the active-matrix substrate as shown in FIG. 4, taken along a line V—V.

Referring to FIG. 3 and FIG. 5, a gate line 22 is formed on a glass substrate 21. The gate line 22 works as a gate electrode in a TFT 23. A semiconductor active layer 25 is formed on a gate insulator layer 24 on the gate electrode. Arranged on the semiconductor active layer 25 are a source electrode 27, extending from a data line 26, and a drain electrode 28, with a spacing being maintained therebetween. The drain electrode 28 extends over the gate line 22 and the semiconductor active layer 25 as shown in FIG. 3. Furthermore, the drain electrodes 28 vertically run over pixels D3 and D4, thereby serving as IPS pixel electrodes 29, and extend over the gate line 22 for controlling the pixel D4 and the opposing gate line 22 for controlling the pixel D3, thereby serving as capacitor electrodes 30. Furthermore, the capacitor electrodes 30 extend vertically between the adjacent pixels D3 and D4. The feature of the present invention is that an extended portion 30a of the capacitor electrode 30, extending over the gate line 22, runs from one pixel D4 (D3) into the area of the other pixel D3 (D4).

Figure 6:
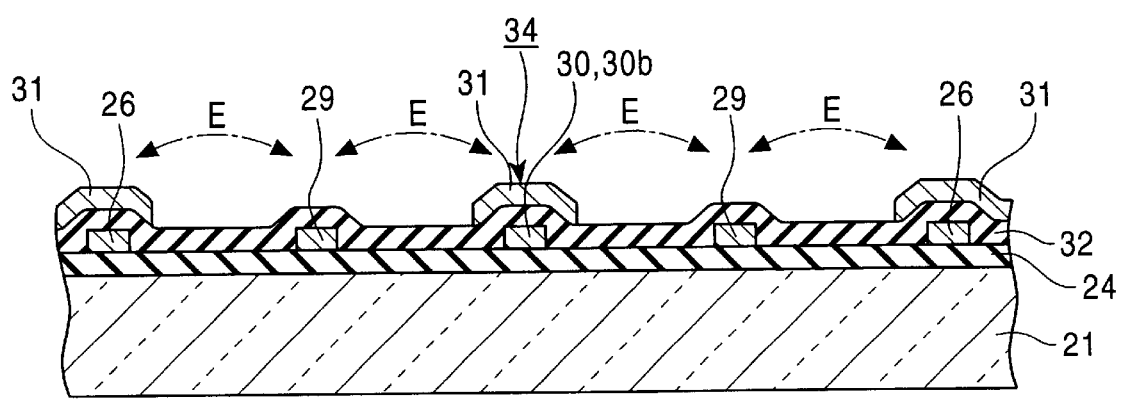
FIG. 6 is a sectional view of the active-matrix substrate as shown in FIG. 4, taken along a line VI—VI.

Referring to FIG. 4 and FIG. 6, a common electrode 31 is formed on an insulator layer 32 over the data line 26, the source electrode 27, the drain electrode 28, and the gate line 22. As represented by solid line rectangles in FIG. 4, the common electrode 31 has an aperture in the center of each of the pixels D3 and D4, and has a frame covering the periphery of each of the pixels D3 and D4. Specifically, the common electrode 31 includes an electrode portion 30b that extends between the adjacent pixels D3 and D4 from the capacitor electrode 30, and a shielding portion for covering the data line 26 and the gate line 22 including the TFT 23. A storage capacitor 33, having a two-layer structure, is created in the extended portion 30a of the capacitor electrode 30 extending over the gate line 22, and includes a capacitance formed between the gate line 22 and the capacitor electrode 30, and a capacitance formed between the capacitor electrode 30 and the common electrode 31, as shown in FIG. 5. A storage capacitor 34, having a single-layer structure, is created in the portion 30b of the capacitor electrode 30 extending between the pixels D3 and D4, and includes a capacitance formed between the capacitor electrode 30 and the common electrode 31, as shown in FIG. 6. The overall capacitance of the entire pixel is the sum of the two-layer structured storage capacitor 33 and the single-layer structured storage capacitor 34.

When a voltage is applied between the pixel electrode 29 and the common electrode 31 in the liquid-crystal display device employing the IPS active-matrix substrate as shown in FIG. 6, a horizontal electric field E, as represented by a one-dot chain line, is established along the surface of the substrate, as shown in FIG. 5. In the liquid-crystal display device, the horizontal electric field E controls the alignment of the liquid crystal.

The second embodiment of the active-matrix substrate has the same advantages as the first embodiment. The storage capacitor 33 is extended into the adjacent pixel, and the aperture ratio is improved. The IPS active-matrix substrate having the two-layer structured storage capacitor 33 of this embodiment forms a storage capacitance even more efficiently, thereby resulting in an improved aperture ratio. In the second embodiment, a constant width gate line 22 works without the need for narrowing the gate line 22, thereby minimizing the gate wiring resistance.

In the second embodiment, the drain electrode 28 of the TFT 23 extends across the gate line 22 and the semiconductor active layer 25. With this arrangement, even if a misalignment of the drain electrode 28 takes place relative to the gate line 22 or the semiconductor active layer 25 in a lithographic process, gate-drain stray capacitances of the TFTs 23 of the adjacent pixels D3 and D4 remain equal. Field-through voltages in the adjacent pixels D3 and D4 also remain equal, thus controlling flickering and luminance nonuniformity.

Third Embodiment

The active-matrix substrates of the first and second embodiments have been discussed. A third embodiment relates to the entire structure of a liquid-crystal display device including the active-matrix substrate.

Figure 7A:
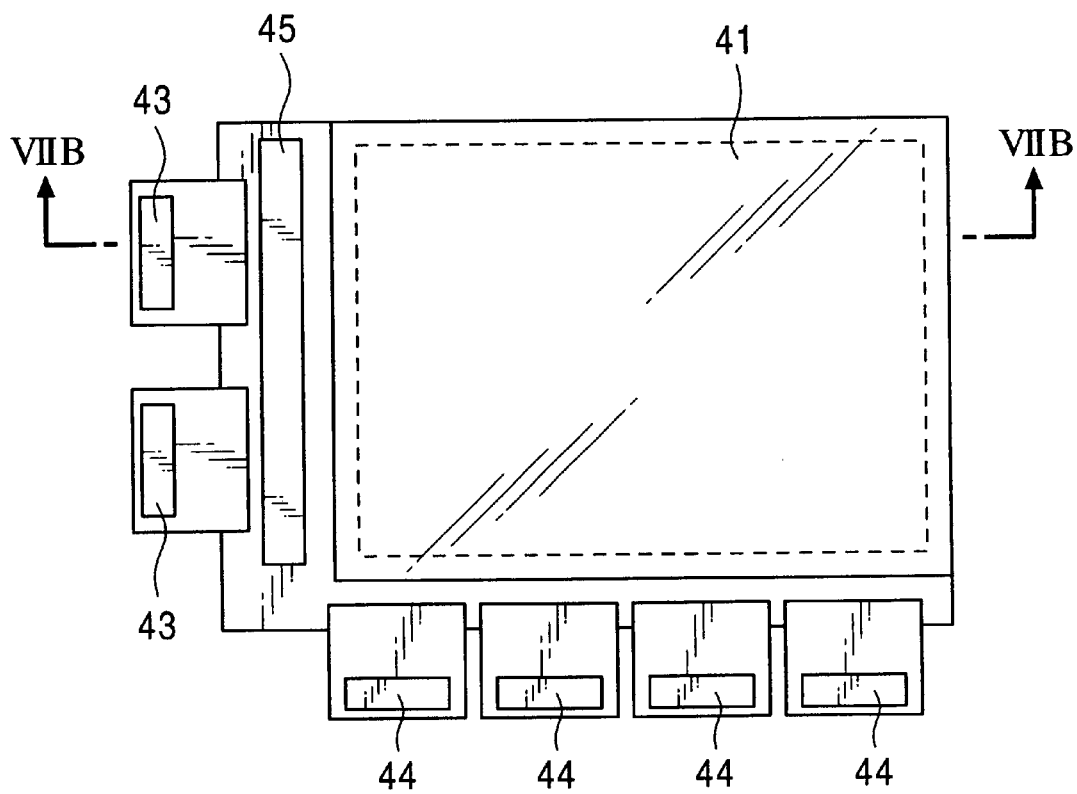
Figure 7B:
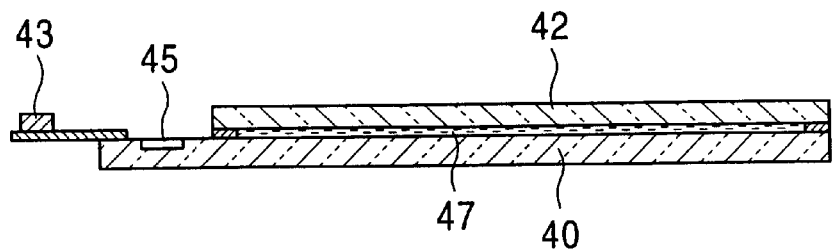

FIGS. 7A and 7B show the construction of the active-matrix liquid-crystal display device of the third embodiment. FIG. 7A is a plan view of the device and FIG. 7B is a sectional view taken along a line VIIB—VIIB shown in FIG. 7A. Referring to both figures, an active-matrix substrate 40, and a TFT matrix section 41 including pixel electrodes, TFTs, storage capacitances, data lines and gate lines are shown. The TFT matrix section 41 remains unchanged from that in the first and second embodiments, and the discussion about it is not repeated here.

A counter substrate 42 is provided with a common electrode facing each pixel electrode when the active-matrix substrate of the first embodiment is assembled. The active-matrix substrate 40 and the counter substrate 42, facing each other, are separated by an encapsulated crystal 47. Gate drivers 43 and data drivers 44 are also shown. Each driver has 240 output terminals.

The active-matrix liquid-crystal display device is a VGA (Video Graphics Array) liquid-crystal panel having 1920 pixels in the direction of columns and 480 pixels in the direction of rows. With the active-matrix substrate of the first embodiment employed, the TFT matrix section 41 has 960 data lines and 960 gate lines.

The four data drivers are attached to the active-matrix substrate 40 to connect to the 960 data lines. The 960 gate lines may need four gate drivers 43. In this embodiment, however, the use of a demultiplexor 45 on the active-matrix substrate 40 halves the number of required gate drivers 43 to two.

The demultiplexor 45 is constructed of TFTs and signal wiring.

Figure 8:
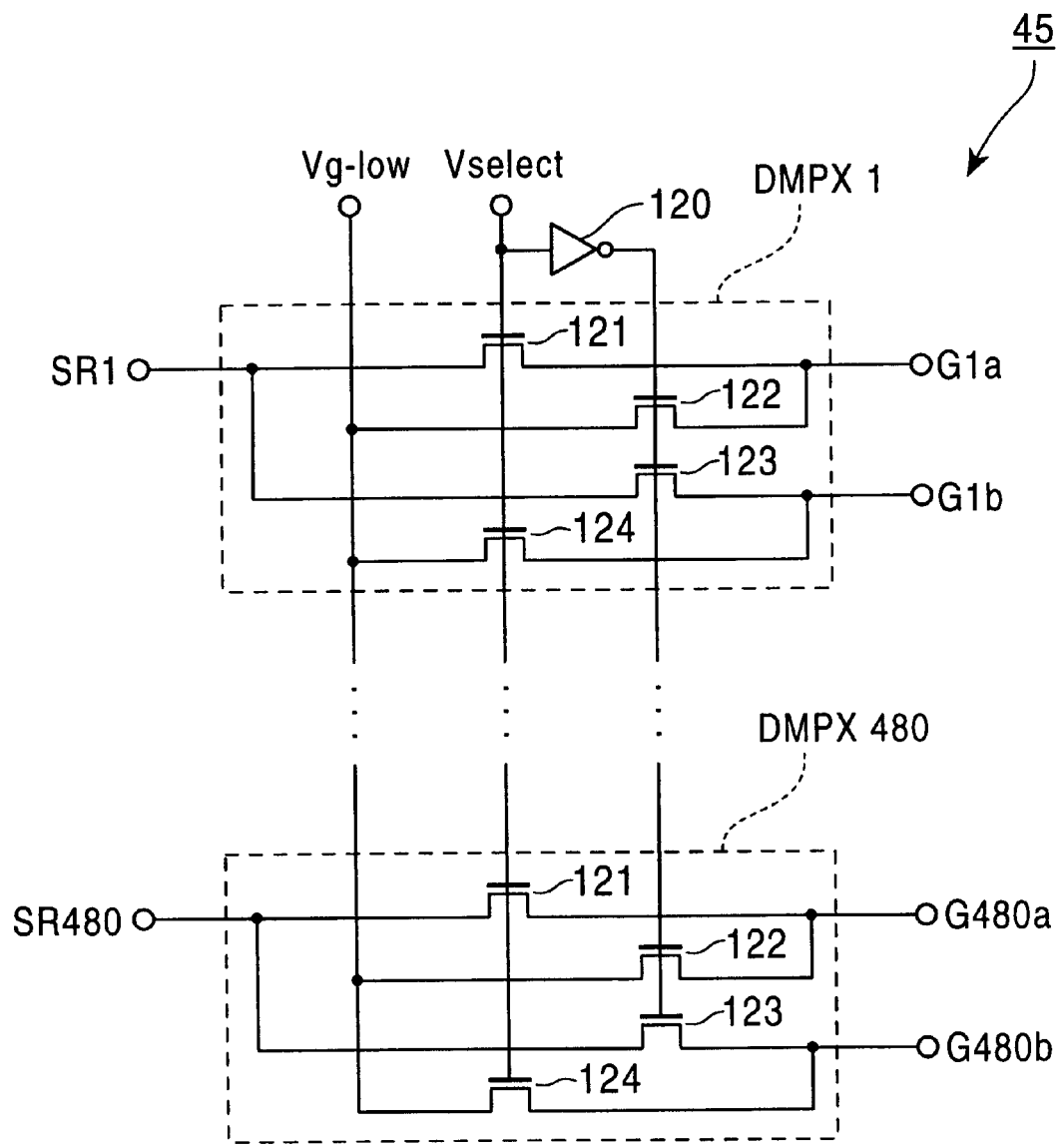
FIG. 8 is a circuit diagram showing a demultiplexor in the third embodiment.

FIG. 8 is a circuit diagram of the demultiplexor 45. As shown, the demultiplexor 45 is constructed of an inverter 120 and 480 demultiplexors DMPX 1 through DMPX 480. Each demultiplexor has four transfer gates 121–124, each constructed of a TFT. Each of the transfer gates 121–124 is supplied with a selection signal Vselect by a control circuit (not shown). The gates of the transfer gates 122 and 123, among the four transfer gates, are supplied with an inverted Vselect signal through the inverter 120.

The operation of third embodiment is now discussed.

The input terminals of the demultiplexors DMPX 1 through DMPX 480 are supplied with 480 output signals SR 1 through SR 480 by the two gate drivers 43 as shown in FIGS. 7A and 7B every field period. The level of the selection signal Vselect is alternately inverted each time one field period ends. As a result, the demultiplexor 45 operates as below. It is noted here that the transfer gates 121 through 124 are constructed of an n-channel TFT.

When the selection signal Vselect is at a high level during an odd field period, transfer gates 121 and 124 are on while transfer gates 122 and 123 are off in each of the demultiplexors DMPX 1 through DMPX 480.

During the odd field period, the output signals SR 1 through SR 480 successively output by the gate drivers are successively fed to first 480 gate lines G1a through G480a through the transfer gates 121 of the demultiplexors DMPX 1 through DMPX 480. Meanwhile, second gate lines G1b through G480b are fed with a low-level reference voltage Vg-low via the transfer gates 124 of the demultiplexors DMPX 1 through DMPX 480. All TFTs connected to the second gate lines remain off in the TFT matrix section 41 throughout this period.

When the selection signal Vselect is driven to a low level with the field switched to an even field, the transfer gates 122 and 123 are on while the transfer gates 121 and 124 are off in each of the demultiplexors DMPX 1 through DMPX 480.

During the even field period, the output signals SR 1 through SR 480 successively output by the gate drivers are successively fed to the second gate lines G1b through G480b through the transfer gates 123 of the demultiplexors DMPX 1 through DMPX 480. Meanwhile, the first gate lines G1a through G480a are fed with a low-level reference voltage Vg-low via the transfer gates 122 of the demultiplexors DMPX 1 through DMPX 480.

With the demultiplexor 45 employed, the destination of the output signals of the gate drivers is alternated between the first gate lines and the second gate lines in response to the field period in an interlace scanning method, for example, the output signals are fed to the first gate lines during the odd field period and to the second gate lines during the even field period. This arrangement halves the number of required gate drivers.

Fourth Embodiment

Figure 9A:
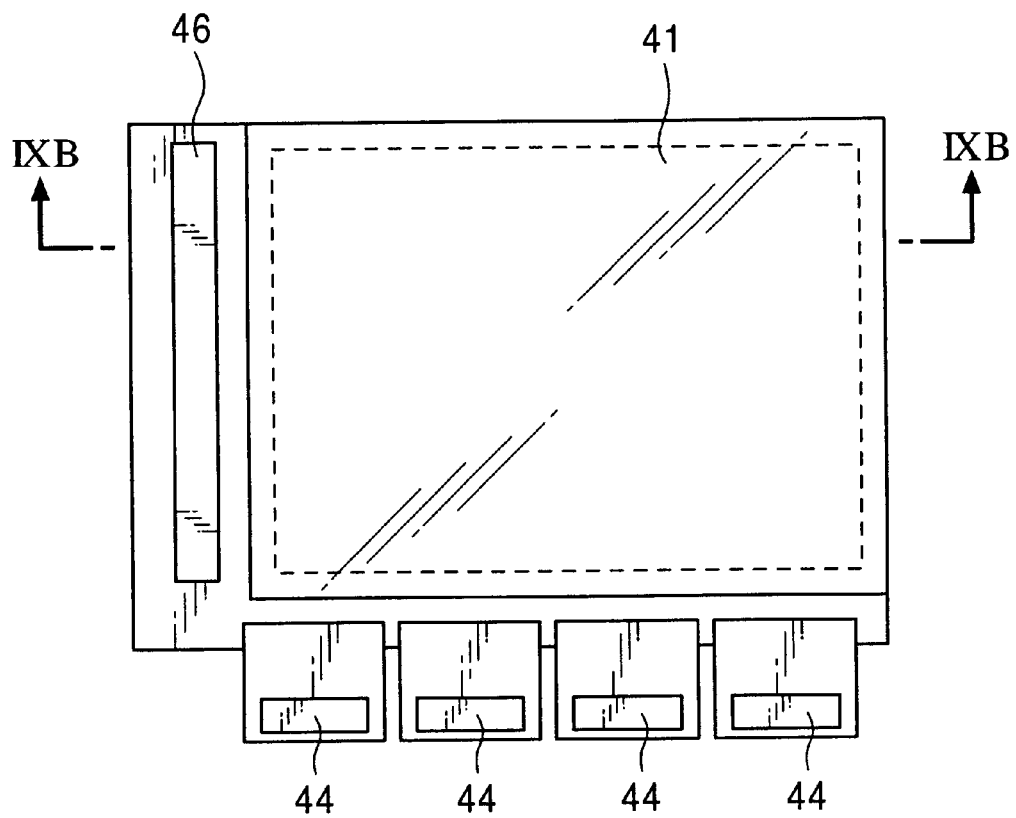
Figure 9B:
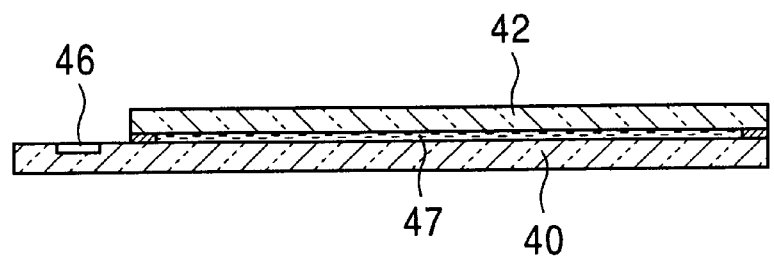

FIGS. 9A and 9B show the construction of the active-matrix liquid-crystal display device of a fourth embodiment. FIG. 9A is a plan view of the device, and FIG. 9B is a sectional view of the device, taken along a line IXB—IXB shown in FIG. 9A.

In the third embodiment, the number of the gate drivers 43 is halved by introducing the demultiplexor 45 into the active-matrix substrate 40. In the fourth embodiment, the external gate drivers 43 are dispensed with by forming, on the active-matrix substrate 40, a shift register 46 rather than the demultiplexor 45.

Figure 10:
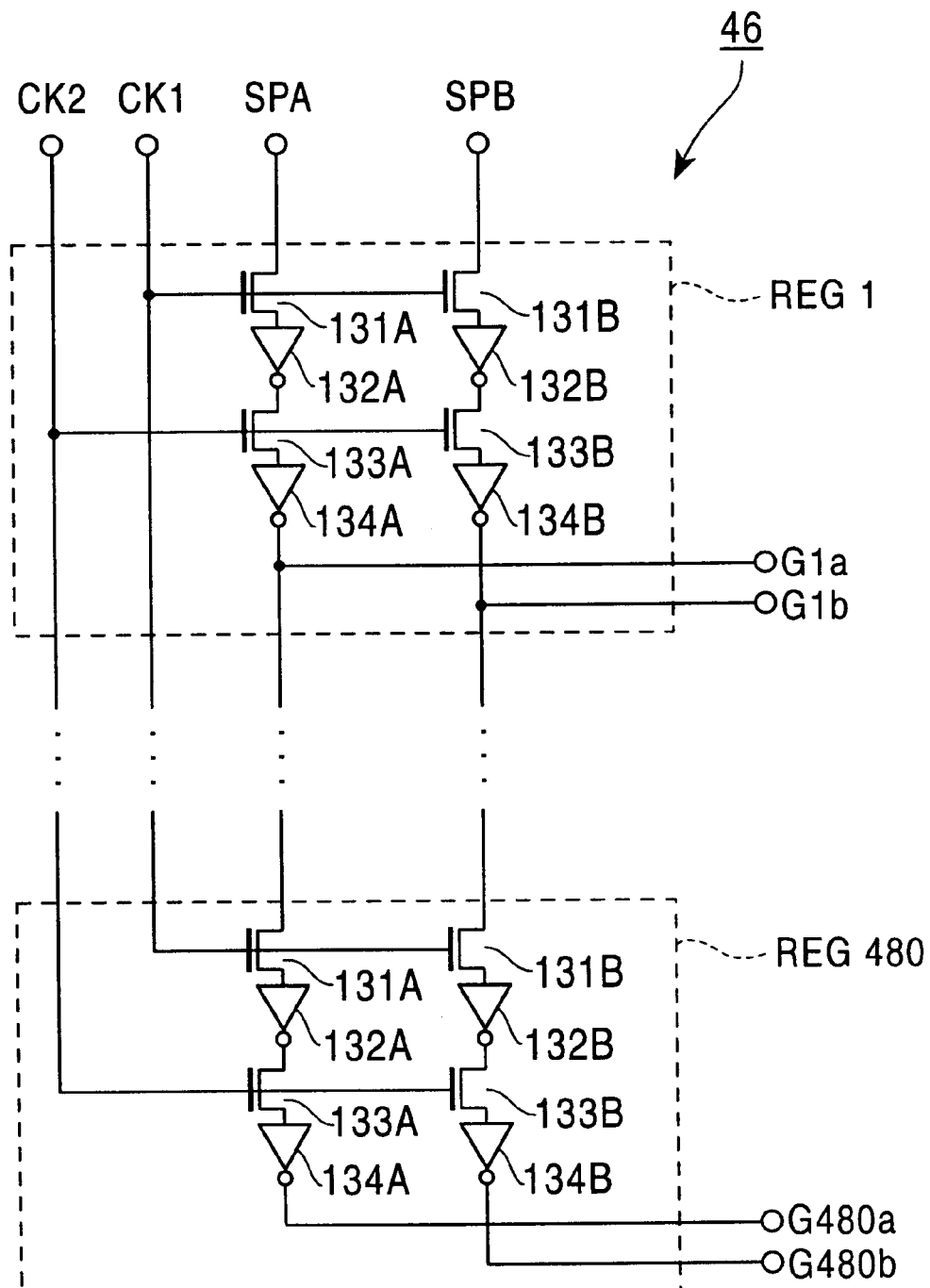
FIG. 10 is a circuit diagram of a shift register in the fourth embodiment.

FIG. 10 is a circuit diagram of the shift register 46. The shift register 46 is constructed of 480 cascaded registers, REG 1 through REG 480. Each register includes a first flipflop composed of a transfer gate 131A, an inverter 132A, a transfer gate 133A, and an inverter 134A, and a second flipflop composed of a transfer gate 131B, an inverter 132B, a transfer gate 133B, and an inverter 134B. The output terminals of the first flipflops (i.e., the output terminals of the inverters 134A) in the registers REG 1 through REG 480 are respectively connected to the first gate lines G1a through G480a in the TFT matrix section 41. On the other hand, the output terminals of the second flipflops (i.e., the output terminals of the inverters 134B) in the registers REG 1 through REG 480 are respectively connected to the second gate lines G1b through G480b in the TFT matrix section 41.

The operation of the fourth embodiment is now discussed.

The shift register 46 is supplied with two-phase clocks, clock CK1 and clock CK2. The first phase clock CK1 is fed to the transfer gates 131A and 131B in each register, and the second phase clock CK2 is fed to the transfer gates 133A and 133B in each register.

At the start of the odd field period, a start pulse SPA is fed to the first flipflop in the first register REG 1. During the odd field period, the start pulse SPA is shifted from one first flipflop to the next in the cascaded registers. As a result, gate voltages corresponding to the start pulse SPA are successively output from the output terminals of the first flipflops in the registers (i.e., the output terminals of the inverters 134A) and are fed to the first gate lines G1a through G480a.

The shift operation is also carried out among the second flipflops in the registers during the odd field period, and a low-level signal is fed to the second flipflop in the first register REG 1. During the odd field period, the second gate lines G1b through G480b are fixed at a low level.

At the start of the even field period, a start pulse SPB is fed to the second flipflop in the first register REG 1. During the even field period, the start pulse SPB is shifted from one second flipflop to the next in the cascaded registers. As a result, gate voltages corresponding to the start pulse SPB are successively output from the output terminals of the second flipflops in the registers (i.e., the output terminals of the inverters 134B) and are fed to the second gate lines G1b through G480b.

The shift operation is also carried out among the first flipflops in the registers during the even field period, and a low-level signal is fed to the first flipflop in the first register REG 1. During the even field period, the first gate lines G1a through G480a are fixed at a low level.

In the fourth embodiment, the shift register 46 formed on the active-matrix substrate 40 drives the first gate lines and the second gate lines in the active-matrix section 41 in an interlace scanning method. With this arrangement, no external gate drivers are required, leading to a reduced component count of the device and compact and low-cost design of the device.

Instead of the above shift register 46, a shift register having 480 stages and the demultiplexor 45 of the third embodiment may be formed onto the active-matrix substrate 40. Such a modification provides the same advantages as the third embodiment.

The present invention is not limited to the described embodiments, and various changes and modifications are possible without departing from the scope of the present invention. For example, the capacitor electrode electrically connected to the pixel electrode serves as one electrode of the storage capacitor in the first embodiment. Instead of the capacitor electrode, the pixel electrode itself may be extended from one pixel to the adjacent other pixel along the gate line opposite to the gate line that controls the one pixel, and the pixel electrode and the gate line are used to form a storage capacitor. It is noted that various modifications may be introduced in the configuration and dimensions of the pattern of each layer.

In accordance with the present invention, the cost of the double-scanning-line type liquid-crystal display device is reduced by reducing the number of data lines. Unlike the conventional double-scanning-line type liquid-crystal display device in which the formation of the storage capacitor is limited to within the area of one pixel, the region of the storage capacitor is extended, between the data lines, into the adjacent other pixel. The gate lines are efficiently used to create the storage capacitor. As a result, greatly widening the gate line to form the storage capacitor is unnecessary. This arrangement improves the aperture ratio and the gate line having no extremely narrow portion helps minimize the gate wiring resistance.

What is claimed is:

1. A substrate for an active-matrix liquid crystal display device, comprising:

a plurality of data lines and a plurality of gate lines arranged in a matrix on the substrate;

thin-film transistors, having pixel electrodes connected thereto so as to form desired pixel regions, arranged on both sides of each data line corresponding to the respective gate line, the plurality of gate lines being arranged so that the pixel electrodes on both sides of each data line are controlled by signals from corresponding paired gate lines sandwiching the pixel electrodes arranged on both sides of the data line; and a first capacitor electrode being located on the other gate line paired with the one controlling gate line which drives one of first and second pixel regions positioned between the adjacent data lines, said first capacitor electrode linearly extending across a central line of said adjacent data lines from the vicinity of the data line located in proximity with the pixel electrode corresponding to said first pixel region to said thin-film transistor which is connected to the pixel electrode corresponding to said second pixel region and which is controlled by a signal from the other gate line; and a second capacitor electrode extending from said first capacitor electrode and passing through the pixel electrode corresponding to said first pixel region so that said second capacitor electrode partially overlaps with said pixel electrode, said second capacitor electrode being electrically connected to said pixel electrode;

wherein the other gate line is located below said first capacitor electrode and said second capacitor electrode and has an outer configuration matching the outer configurations of said first capacitor electrode and said second capacitor electrode; and wherein a storage capacitor corresponding to each of said first and second pixel regions is formed by said first and second capacitor electrodes corresponding to each of said first and second pixel regions and by the other gate line located below said first and second capacitor electrodes.

2. An active-matrix display device having a liquid crystal interposed between a pair of opposing substrates, wherein one of the substrates is the substrate according to claim 1.

3. A substrate for an active-matrix liquid crystal display device, comprising:

a plurality of data lines and a plurality of gate lines arranged in a matrix on the substrate;

thin-film transistors, having pixel electrodes connected thereto so as to form desired pixel regions, arranged on both sides of each data line corresponding to the respective gate line, the plurality of gate lines being arranged so that the pixel electrodes on both sides of each data line are controlled by signals from corresponding paired gate lines sandwiching the pixel electrodes arranged on both sides of the data line;

a capacitor electrode being located on the other gate line paired with the one controlling gate line which drives one of first and second pixel regions positioned between the adjacent data lines, said capacitor electrode extending across a central line of said adjacent data lines from the vicinity of the data line located in proximity with the pixel electrode corresponding to said first pixel region to said thin-film transistor which is connected to the pixel electrode corresponding to said second pixel region and which is controlled by a signal from the other gate line, said capacitor electrode being electrically connected to the pixel electrode corresponding to said first pixel region;

wherein a storage capacitor corresponding to each of said first and second pixel regions is formed by said capacitor electrode corresponding to each of said first and second pixel regions and by the other gate line located below said capacitor electrode.

4. An active-matrix liquid crystal display device having a liquid crystal between a pair of opposing substrates, wherein one of the substrates is the substrate according to claim 3.

5. A substrate for an active-matrix liquid crystal display device, comprising:

a plurality of data lines and a plurality of gate lines arranged in a matrix on the substrate;

thin-film transistors, having linear pixel electrodes connected thereto and extending along said data lines so as to vertically run over desired pixel regions, arranged on both sides of each data line corresponding to the respective gate line, the plurality of gate lines being arranged so that the pixel electrodes on both sides of each data line are controlled by signals from corresponding paired gate lines sandwiching the pixel electrodes arranged on both sides of the data line;

a first capacitor electrode being located on the other gate line paired with the one controlling gate line which drives one of first and second pixel regions positioned between the adjacent data lines, said first capacitor electrode linearly extending across a central line of said adjacent data lines from the vicinity of the data line located in proximity with the pixel electrode extending from the controlling gate line to said thin-film transistor which is connected to the pixel electrode corresponding to said second pixel region and which is controlled by a signal from the other gate line, said first capacitor electrode being electrically connected to the pixel electrode corresponding to said second pixel region;

a second capacitor electrode extending from said first capacitor electrode and passing through the central line of said adjacent data lines; and a common electrode which is formed on an insulating film covering said thin-film transistors, said pixel electrodes, and said first and second capacitor electrodes, and which has an aperture formed by said pixel regions so as to surround said pixel regions;

wherein the capacitance of a storage capacitor corresponding to each of said first and second pixel regions is the sum of the capacitance of said first capacitor electrode corresponding to each of said first and second pixel regions, the capacitance of the other gate line located below said first capacitor electrode, the capacitance of said second capacitor electrode corresponding to each of said pixel electrodes, and the capacitance of said common electrode located above said second capacitor electrode.

6. An active-matrix liquid crystal display device having a liquid crystal between a pair of opposing substrates, wherein one of the substrates is the substrate according to claim 5.

* * * * *

UNITED STATES PATENT AND TRADEMARK OFFICE
CERTIFICATE OF CORRECTION

PATENT NO. : 6,292,237 B1
DATED : September 18, 2001
INVENTOR(S) : Hiroyuki Hebiguchi It is certified that error appears in the above-identified patent and that said Letters Patent is hereby corrected as shown below:

<u>Title page,</u>
Item [73], Assignee, delete "Seol" and substitute -- Seoul -- in its place.

Signed and Sealed this

Twenty-ninth Day of June, 2004

JON W. DUDAS
*Acting Director of the United States Patent and Trademark Office*